Figure 4:
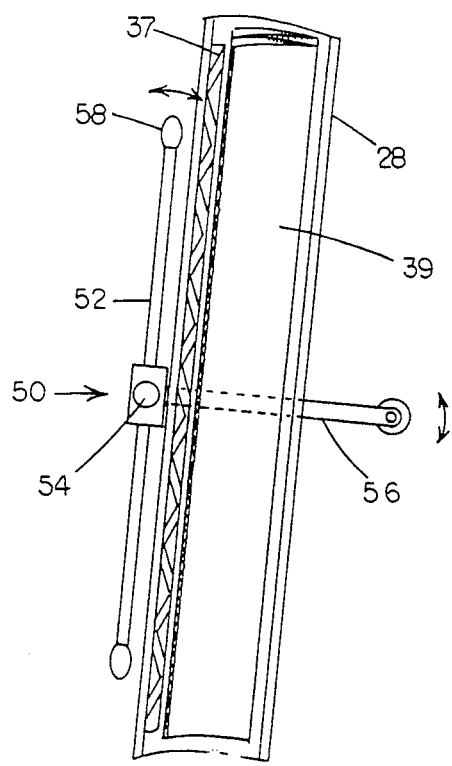

US005103760A

United States Patent [19]
Johnson

[11] Patent Number: 5,103,760
[45] Date of Patent: Apr. 14, 1992

[54] LIQUID TO POWDER SPRAY BOOTH CONVERSION INSERT

[76] Inventor: Walter F. Johnson, R.D. 2, Jordanville Rd., Ilion, N.Y. 13357

[21] Appl. No.: 627,988

[22] Filed: Dec. 17, 1990

[51] Int. Cl.[5] .......... B05C 5/02

[52] U.S. Cl. .......... 118/309; 55/299; 55/356; 55/486; 55/DIG. 46; 118/326; 118/603; 118/DIG. 7; 454/53

[58] Field of Search .......... 118/308, 309, 326, 603, 118/610, DIG. 7; 98/115.1, 115.2; 55/356, 293, 299, 304, 486, 497, 521, DIG. 46

[56] References Cited

U.S. PATENT DOCUMENTS

| | | | |
|---|---|---|---|
| 3,290,870 | 12/1966 | Jensen | 55/486 |
| 3,719,030 | 3/1973 | Blankemeyer et al. | 55/356 X |
| 4,163,650 | 8/1979 | Watson et al. | 55/356 X |
| 4,245,551 | 1/1981 | Berkmann | 118/326 X |
| 4,277,260 | 7/1981 | Browning | 55/356 X |
| 4,354,451 | 10/1982 | Vohringer et al. | 118/326 |
| 4,383,840 | 5/1983 | Jones | 55/299 X |
| 4,563,943 | 1/1986 | Bertelsen | 98/115.1 |
| 4,590,884 | 5/1986 | Kreeger et al. | 98/115.2 X |
| 4,662,309 | 5/1987 | Mulder | 55/356 X |
| 4,708,723 | 11/1987 | Howeth | 55/356 X |

*Primary Examiner*—Richard L. Chiesa

*Attorney, Agent, or Firm*—Wall and Roehrig

[57] ABSTRACT

A liquid to powder spray booth conversion insert compartment is provided that can be rolled up to a conventional wet paint spray booth to convert it to dry powder usage. A pleated fiber filter having a pore size of 20 microns inclined above powder collection trays is provided to allow collection and reuse of the powdered materials. A prefilter of progressive weave filter material is provided at the input side of the compartment to remove large size matter while allowing the sprayed powder particles to pass therethrough.

10 Claims, 2 Drawing Sheets

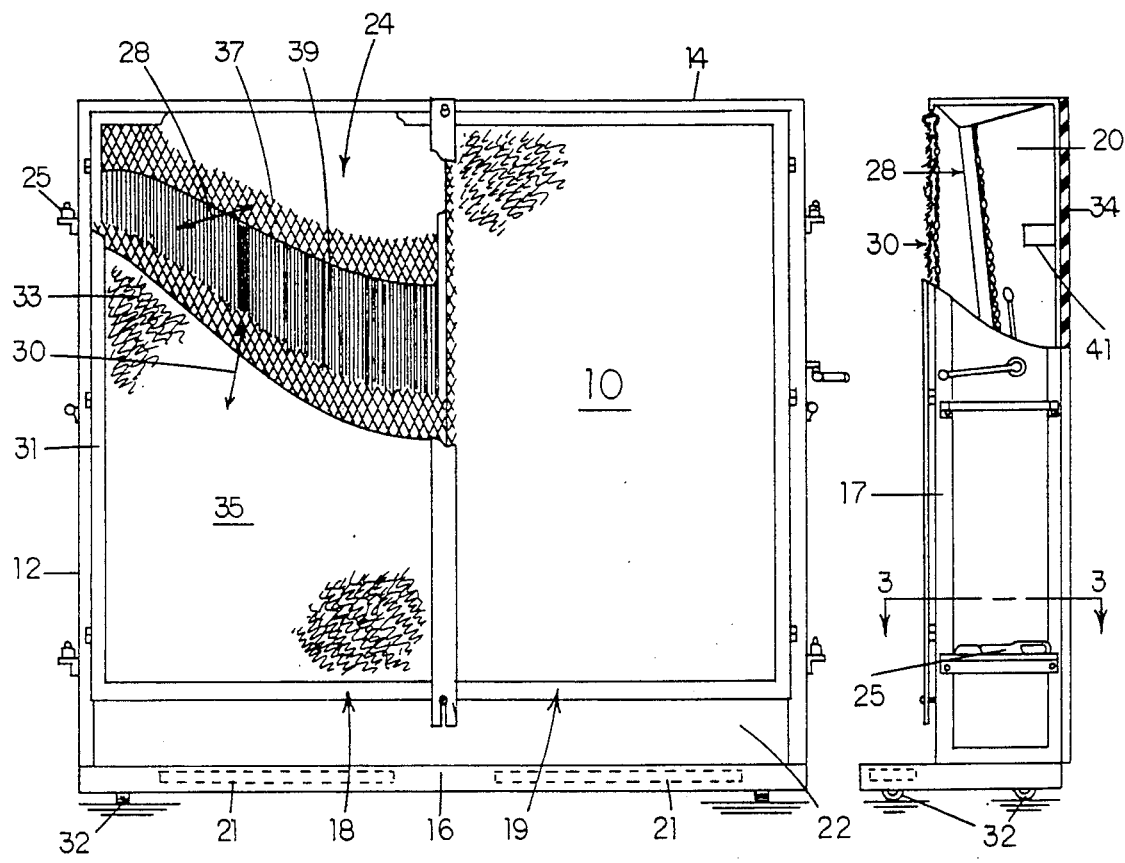
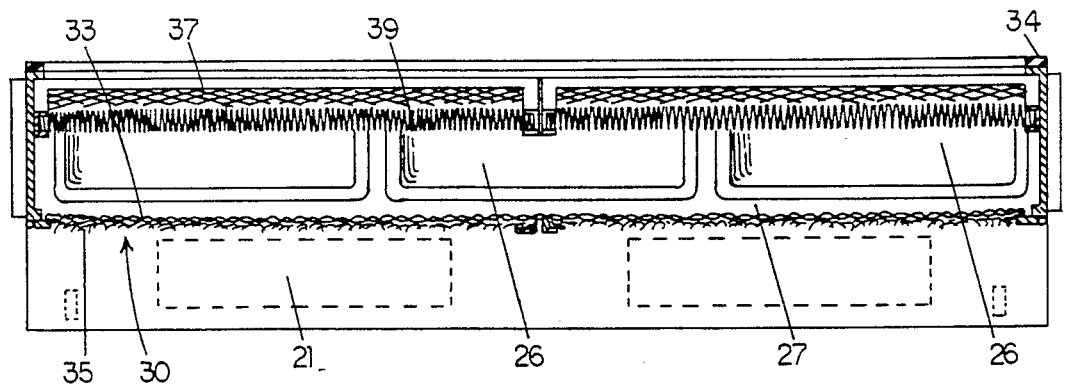

LIQUID TO POWDER SPRAY BOOTH CONVERSION INSERT

BACKGROUND OF THE INVENTION

This invention relates to a method and apparatus for dry powder particle coating of work pieces and for converting a standard wet paint spray booth into a dry powder spray booth assembly. More particularly, this invention relates to a mobile compartment, having dry powder filters and screens mounted therein above powder collecting trays, that can be positioned in front of a standard wet paint spray booth to permit spraying of a dry plastic powder material on a workpiece positioned in front of the compartment.

Manufacturing processes today require the finishing of product with a protective and decorative coating. These coatings can take the form of plating, painting, or plastic coating, depending on the particular finish system employed. One of the methods of coating an article is to apply a dry plastic powder by spraying the powder on an object that has been pre-heated or electrostatically charged to attract the powder and cause it to be retained on the article until the article can be baked to melt and fuse the powder to the article. The advantages of this dry powder method of coating a product over the conventional painting or plating coating systems is that the plastic powders are 100% solids and have no solvent vehicles that evaporate during the drying process thereby causing pollution, fire and explosion hazards. While the dry powder system has many advantages, there are still many applications where a wet paint system must be used. Accordingly, most custom coating companies, paint shops and the like, must maintain a wet spray paint booth with suitable exhaust and pollution equipment. Since this equipment must be optimized for the capture of the solvents and liquid overspray, the systems are not ideally suited to capture plastic particles that may be oversprayed in the solid plastic particle systems. The solid plastic particles that miss the object to be painted impinge on the filter in a basically undamaged condition and can be collected and reused. It is therefore advantageous to have a spray booth system that not only prevents discharge of powder particles with its consequent pollution hazard, but one that collects the "overspray" powder for reuse in the coating operation. Since many shops already have extensive wet spray booth installations, I have found it advantageous to be able to provide a mobile auxiliary compartment that allows the instantaneous conversion of the wet spray booth to a dry powder spray booth by simply wheeling a dry powder compartment into place in front of a wet paint spray booth and attaching it thereto in a sealed configuration for straight-through airflow from the ambient into the wet paint spray booth exhaust and pollution control system. The mobile compartment dry powder spray booth of the present invention also provides a capability for collecting powder overspray and reusing it on another product. By the provision of multiple dry powder booth units and/or multiple filters and collecting trays different colors can be accommodated.

OBJECTS AND SUMMARY OF THE INVENTION

It is therefore an object of the present invention to provide an apparatus that overcomes the limitations of the prior art.

It is another object of the present invention to provide a mobile dry powder spray booth attachment for converting a wet paint spray booth to dry powder use.

It is a further object of the present invention to provide an auxiliary dry powder spray booth for wet paint spray booths that can easily be moved into and out of position for intercepting and collecting the dry powder, while utilizing the air-moving and pollution control capabilities of an existing wet paint spray installation.

It is yet a further object of the present invention to provide a dry powder spray booth in which oversprayed powder can be collected and removed for reuse quickly and easily.

It is yet another object of the present invention to provide a dry powder spray booth compartment in which oversprayed powder is efficiently filtered from the exhaust air to meet environmental and production requirements.

It is a still further object of the present invention to provide an auxiliary dry powder spray booth that does not require integral air moving and pollution treatment equipment.

BRIEF DESCRIPTION OF THE DRAWINGS

These and other and further objects and advantages thereof will be apparent by reference to the following drawings in which:

FIG. 1 is a front elevation partially broken away of the dry powder spray booth of the present invention;

FIG. 2 is a side elevation partially broken away taken from the right of FIG. 1 showing the filter members of the present invention in the booth.

FIG. 3 is a sectional view taken along 3—3 of FIG. 2 showing the pre-filter, filter and powder collecting box arrangements;

FIG. 4 is a perspective view of the filter sealing means used at the bottom and top of the pleated filter;

FIG. 5 is a back elevational view showing the beater arms.

FIG. 6 is a sectional view of the pleated filter vibrating means for dislodging powder particles from the filter.

DETAILED DESCRIPTION OF THE PREFERRED EMBODIMENT

Referring now to FIGS. 1 and 2, the auxiliary mobile dry powder compartment 10 comprises a rectangular compartment having side walls 12, a top 14 and a bottom frame member 16 with front pre-filter doors 18 and 19 on one side, with the back side shown at 20 being essentially open. The overall compartment 10 is divided generally into a bottom section 22 and an upper section 24. The bottom section 22 has positioned therein trays 26 which will be described in more detail in connection with FIG. 3, positioned to collect any "overspray" powder for possible reuse. Positioned within the compartment 24 are one or more filter members 28 and pre-filter 30 which form the doors 18 and 19.

As may be seen in FIGS. 1 and 2, a framework 17 of angle iron or channels is generally provided over which sheet metal sides, tops and bottoms are affixed to form the overall compartment 24 and the base compartment 22. The compartment formed on framework 17 is mounted on base member 16 which has four swiveling casters 32 mounted on the underside thereof. Base member 16 extends front to back approximately twice the width of the compartments 22 and 24 and has counterweights 21 fixed to the underside to provide stability for the unit when it is wheeled around on the floor. A gasket 34 is provided around the circumference of the outlet from compartment 24, which is adapted to mate with a conventional wet paint spray booth apparatus so as to form a substantially airtight connection thereto. Adjustable clamps 25 are provided for this purpose. In use, the compartment would be rolled up to the face of a wet paint spray booth with the gasket positioned to engage the frame and outer surface of the wet paint spray booth so that air can enter from the left hand side of FIG. 2, traverse through the screen 30 and filter 28 in the compartment 24 and be drawn through and exhausted by the usual fan exhaust system of the wet spray paint booth.

The trays 26, which may be seen more clearly in FIG. 3, are positioned in openings in a shelf 27 in the compartment 22 and extend substantially throughout the entire bottom surface of the compartment 24. Powder dislodged from filter 28 is collected in the trays and the trays 26 can be removed to salvage the powder for reuse.

The prefilter doors 18 and 19 comprise a hinged frame 31 in which is mounted an expanded metal panel 33. Panel 33 is covered with a progressive weave polyester fabric 35. The tight weave side is positioned toward the input side of the compartment 24 and is secured about the panel 33 by crimping the edges of the expanded metal back on itself and over the fabric 35. The fabric 35 preferably has a denier of 6.3 or a pore size of at least 100 microns and filters out large debris and particles that might damage the pleated filter 28. The dry powder particles used in coating a workpiece generally are 20–45 microns in diameter and readily pass through the fabric 35 as if it were not there. The filter 30 is formed into doors 18 and 19 so that easy access may be had to the filter 28 and the trays 26 inside compartment 24 of the spray booth 10.

Figure 5:
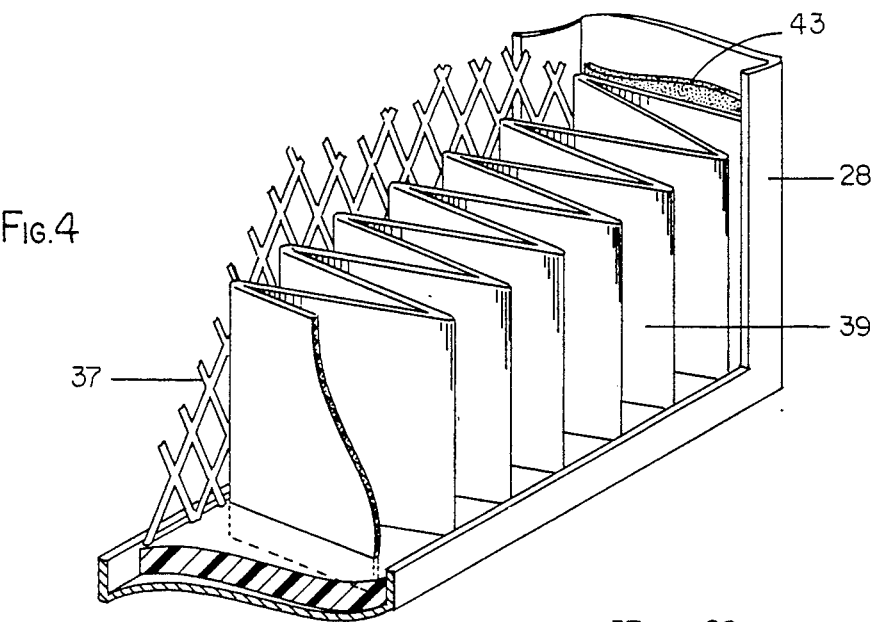

The filter 28 is mounted within chamber 24 and comprises a panel of expanded metal mesh 37 and a pleated paper fiber element 39 which faces the entrance or door side of the chamber 24. The pleated fiber element is designed to capture the oversprayed solid plastic particles on the surface thereof. The pleated fiber filter 28 will stop the powder particles as air is drawn therethrough. The particles will collect on the front face thereof, and as the layer of powdered particles builds up on the face of the filter, they will tend to drop off downwardly. The filter 28 is sloped toward the entrance to the compartment so that the falling particles will not collect on the filter, but will fall directly into the trays 26 at the bottom of the compartment 24. A slope of six degrees from the vertical has been found to be satisfactory. The element 39 is pleated with the pleats running vertically to assists in clearing the loose particles into the trays 26. As may be seen in FIGS. 4 and 5, the bottom and top edges of filter fabric 39 are "potted" in a sealing resin poured into the frame channel to prevent leakage of any air and hence plastic particles past the fabric 39. The sides of fabric 39 are also glued to the inside of the vertical frame channels of filter 28 to seal the sides. Any suitable sealing adhesive 43 can be used.

Figure 6:
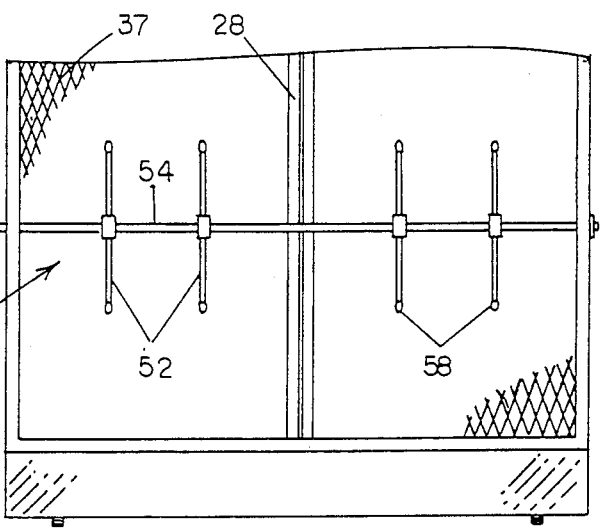

In spraying operations, a minimum air flow rate of sixty CFM has been established by OSHA. The optimum air flow rate for dry powder particle spraying is generally in the range of sixty to seventy CFM. Filter material must be able to pass the desired air flow with pores small enough to remove all undesired particles from the exhaust airstream. The filter material chosen must also permit a practical duration of spraying before cleaning or replacement is required. Ideally, the filter material should stop all particles in the airstream and continuously self-clean so that the static pressure on the fan system would remain unchanged during operation. Obviously, the ideal is never fully achieved, but applicant's filter allows it to be approached.

In the prior art canister/tank type of dry powder filters, the filter material has been designed to trap and hold the powder particles for subsequent removal and reuse. This, together with the limited filter surface area in a tank filter, has severely limited the "production life" of the filter and required frequent "back flushing" with a blast of air to cause the trapped particles to drop to the bottom of the canister.

Applicant has found that by choosing a ninety CFM air flow paper filter material with a pore size of twenty-five microns and applying a flame retardant coating, a filter having an effective pore size of fifteen to twenty microns with ample air flow capacity is obtained. Also, applicant has found that by folding the ninety CFM filter paper into a series of pleats so as to increase the effective filter area five to ten times the rectangular cross-sectional area of filter 28 production may be maintained for at least an entire eight hour shift with an approximate fifty percent transfer rate of plastic particles to the part being coated.

It has been found that with a pleated paper filter as described, the initial "clean" filter static pressure for a 4'×5' cross-sectional area will be 0.25 to 0.3 inches of water. A safety control 41 is provided in the airflow stream to shut off the exhaust fan motor should the static pressure reach 1.1 inches. As indicated above, this has allowed dry powder spraying with a fifty percent transfer for approximately eight hours.

Another advantage of applicant's filter construction is that much higher air flow rates can be accommodated without exceeding the capability of the filter material. In one embodiment having a filter cross-section of 4'×5', a fan air flow of 200 CFM has been easily accomplished.

The filter paper, contrary to the prior art, is positioned in the pleated filter 28 with the smooth side toward the air entrance to enhance the self-cleaning quality of the filter 28 and the collection of the reusable powder in trays 26. In addition, a beater assembly 50 is pivotally mounted on the exit side of filter 28 as shown in FIGS. 5 and 6. A series of arms 52 are mounted on a rod 54 by set screws (not shown) at spaced intervals across the back surface of spray booth 10.

A handle 56 at the end of rod 54 is provided to rotate rod 54 and cause the ends of arms 52 to alternately strike the upper and lower portions of the expanded metal mesh 37. The ends of arms 52 are blunted with a suitable protective knob 58 so that the mesh 37 will not be dented. As the arm 56 is reciprocated back and forth, the mesh 37 is caused to vibrate, which in turn vibrates the pleated paper fiber 39 to cause any powder particles lodged thereon to separate and fall by gravity into the bottom of compartment 24 and the trays 26.

In operation, the mobile compartment 10 is rolled up to a wet paint spray booth and secured in place through clamps 25 or other convenient means. The air exhaust system of the wet paint spray booth is turned on causing air to be drawn through the front of the mobile unit 10 and exhausted out through the usual fan exhaust and pollution control equipment of the wet paint spray booth. An article to be coated is then positioned in front of the pre-filter 30 of the compartment 10 and the usual dry particle plastic spray apparatus used to spray the material onto the article to be coated. The article could be preheated so that the particles will adhere for later baking, or the article may be hung on a conveyor and electrostatically charged so as to attract the particles of plastic material, as is well-known in the art. Since inherently in any spraying operation there is overspray of material, be it wet or dry, the overspray will be drawn by the air going by the object to be sprayed into the mobile compartment 10. The powder particles will pass through pre-filter 30 and will impact upon the filter 28. The filter material on the filter 28 is sized for the particular dry powder in question, and will prevent passage of the powders in the airstream into the wet paint spray booth. Only clean circulation air will be passed through the wet paint spray booth exhaust system. In many situations, the pollution control equipment of the conventional booth can be bypassed or disabled during the dry powder spraying. As may be seen in FIG. 2, the dry powder will collect on the surface of the filter member 28 and then tend to drop by gravity into the trays 26. At the end of the spraying operation of a particular color, the filter 28 can be gently vibrated mechanically as shown in FIG. 6 to cause the extra dry particles to fall off of the filter 28 and fall into the trays 26. The collected dry powder material in the tray 26 can then be reused by opening pre-filter doors 18 and 19 and removing the trays from the compartment 24 and dumping the powder into a suitable container for respraying. Preferably, for a change of powder color the compartment 10 will be replaced with a second compartment for the changed color. Alternatively, the compartment can be thoroughly cleaned and the filters replaced with fresh filters and the trays 26 replaced with fresh trays for the new color.

It is thus seen that I have provided a mobile, liquid to powder conversion insert unit that can be simply and easily used to convert a wet paint spray installation to a dry powder installation at a minimum cost and at a minimum utilization of additional space in the always crowded coating shop. I have also provided a very flexible efficient filter system for dry powder coating systems that can be used as an insert unit or with an exhaust system as a stand alone filtering device.

While this invention has been explained with reference to the structure disclosed herein, it is not confined to the details as set forth and this application is intended to cover any modifications and changes as may come within the scope of the following claims.

What is claimed is:

1. A liquid to powder conversion insert compartment for converting a conventional wet paint spray booth system to a system for coating a workpiece with dry powder particles comprising, in combination:
    a generally rectangular compartment having side, top and bottom wall members, an open back, and an open front;
    a base frame portion fixed to the bottom of said compartment having wheel means mounted on the bottom thereof, so that said compartment may be selectively positioned in front of a wet paint spray booth;
    at least one removable tray positioned in the bottom of said rectangular compartment;
    at least one filter means mounted in said rectangular compartment;
    said filter means extending throughout the cross-section of said compartment so that when said compartment is positioned in front of a wet paint spray booth and the wet paint spray booth exhaust means turned on, overspray of powdered material sprayed on a workpiece positioned in front of said compartment will be drawn into said compartment and captured by said filter member.

2. An insert compartment according to claim 1 wherein said at least one filter means includes:
    a first filter screen member positioned on the front of said compartment; and
    a second pleated fiber filter member mounted in said compartment above said removable tray and downstream from said first filter screen in the direction of air travel through said compartment.

3. An insert compartment according to claim 2 further including said second filter member being mounted at an acute angle with the vertical in said compartment so that powder material being sprayed into the compartment will be stopped on the surface of said filter and fall down into at least one removable tray.

4. An insert compartment according to claim 3 wherein said at least one removable tray is a pair of narrow elongated tray members mounted in the bottom of said compartment for easy removal from said compartment when said compartment is in place in front of a paint spray booth.

5. A compartment according to claim 4 further including gasket means mounted around the open back of said compartment so that when the compartment is wheeled into place in front of a wet paint spray booth, said compartment will form an air tight extension of the wet paint spray booth.

6. A compartment according to claim 1 further including said base frame portion having a depth front to back approximately twice the depth of said compartment, said wheel means includes a plurality of caster wheels mounted on the underside of said compartment and a counter balance weight fixed to the underside of said base so that said compartment can be wheeled about without tipping over.

7. A compartment according to claim 1 wherein said at least one filter means includes:
    a large rectangular frame;
    a pleated paper filter member mounted in said frame with the pleats oriented vertically in said frame; and
    sealing means for securing said filter member to said frame about the periphery thereof to prevent air from bypassing the filter member when said filter means is mounted in a spray booth.

8. A compartment according to claim 7 wherein said pleated paper filter member comprises a flame retardant paper.

9. A compartment according to claim 8 further including an expanded metal mesh member mounted in said frame on the discharge side of said pleated paper filter member to protect and support said filter member.

10. A compartment according to claim 9 further including a second filter member mounted upstream from said pleated paper filter member, said second filter member having a filter material with a pore size of at least 100 microns so that dry powder particles to be sprayed on a work piece will pass therethrough but larger undesired material and objects will be captured and kept from impinging on said pleated paper filter member.

* * * * *